Sept. 20, 1932.  E. S. MILLO  1,877,935

ICE CREAM DIPPER

Filed June 6, 1931

Inventor

Ernest S. Millo,

By James L. Norris,

Attorney

Patented Sept. 20, 1932

1,877,935

UNITED STATES PATENT OFFICE

ERNEST S. MILLO, OF BRONX, NEW YORK, ASSIGNOR TO DAVID SHLAIFER, OF BRONX, NEW YORK

ICE CREAM DIPPER

Application filed June 6, 1931. Serial No. 542,628.

My invention relates to ice cream dippers and particularly to dippers for removing measured quantities of ice cream from a freezer or other receptacle, moulding them into disks or waffles, and cutting the waffles loose and releasing them.

My invention further relates to the mechanism for rotating the cup of the dipper by a step-by-step movement to enable the cup to be partially filled by scraping up the cream with one portion of the edge, then rotated half a revolution to enable the cup to be filled by using the opposite portion of the edge as a scraper, and again rotated to cooperate with stationary cutters for releasing the molded disk or waffle.

Disks of ice cream may be served in paper boxes of pill-box form with wooden spoons. Such packages are easy to store and a number of them may be stacked and carried at one time. It is not necessary to eat the container with the cream, as in the case of ice cream cones. The cream does not leak immediately if it melts, and the box and spoon may be thrown away after use.

Notwithstanding these and other advantages, no practicable implement for making ice cream disks in comparatively small quantities has heretofore been produced. Dippers in common use shape the cream into cones. Large machines make bricks which can be sliced into flat rectangles. There is nothing in the form of a dipper that will shape the cream into disks as it is scooped from the mass.

When a shallow cylindrical non-rotating cup is used, it immediately fills on one side, but the contents slope toward the other side to such an extent that the bottom is scarcely covered on that side. By using a rotary cup with fixed cutters the opposite edge may be used to complete the operation and fill the cup "level full". Rotary cups conical in form are already known, but such arrangement amounts to a mere reversal of parts as compared with the stationary cup and rotary cutter, since no new practical result is obtained because there is no difficulty in filling the deep cup with its sloping sides substantially as full with a non-rotary cup. It is only when a shallow cup with vertical walls is used that a new and useful result is obtained by combining it with rotating means.

Another important feature contributing to the success of my invention is the pawl and ratchet drive. If the usual gearing were used, there would be no way of stopping the cup at the half-way point with any degree of certainty. Even if this were possible, it would be difficult to start the operating lever again from its ineffective half-way position. More cream has been scooped into the cup since the first partial revolution and must be cut loose during the second step of the revolution, but with the lever in a false position the second operation is unduly hard. With my arrangement the lever returns to normal position after each step, making the second step as easy as the first. My arrangement is easy of operation for the additional reason that half the contents of the cup are cut loose during the first step and the other half during second step, thus distributing the resistance to be overcome by the user.

My invention consists in the novel means set forth in the following description and claims, and shown in the accompanying drawing, in which:—

Similar characters designate the same parts throughout the specification and drawing.

Figure 1:
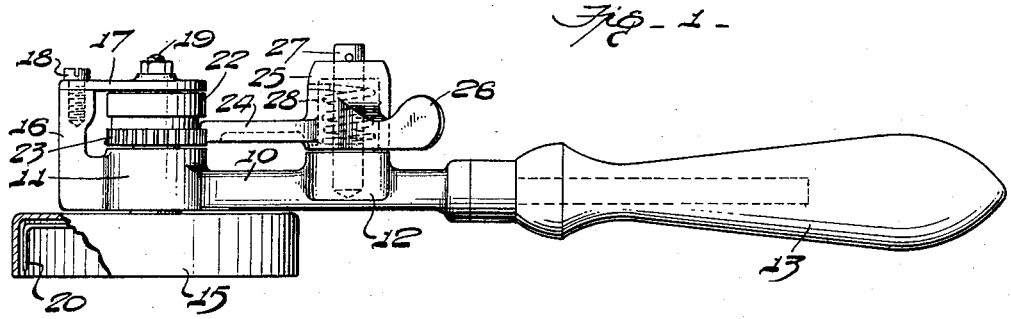
Fig. 1 is a side elevation of my improved dipper.

The frame or support of my device consists of a shank 10 having enlargements 11 and 12 for supporting the cup and its associate parts and the operating lever respectively. At the other end of the shank is the handle 13. Journalled in an aperture in the enlargement 11 is a sleeve 14 carrying at one end the shallow cylindrical cup 15. At the extreme end of the shank is a post or upright 16, at the upper end of which is secured a plate 17 by means of screws 18. A rectangular depression or socket 21 is formed in the upper end of the post, into which may be inserted a similarly shaped lug or dowel projecting from or through plate 17 for more rigidly securing the plate to the post. A rod 19 rigidly secured to plate 17 extends downward through the sleeve 14, and to its lower end are attached the blades 20 of the cutter. It will be noted that the cutter is held in fixed position while the cup is mounted for rotary movement.

Figure 2:
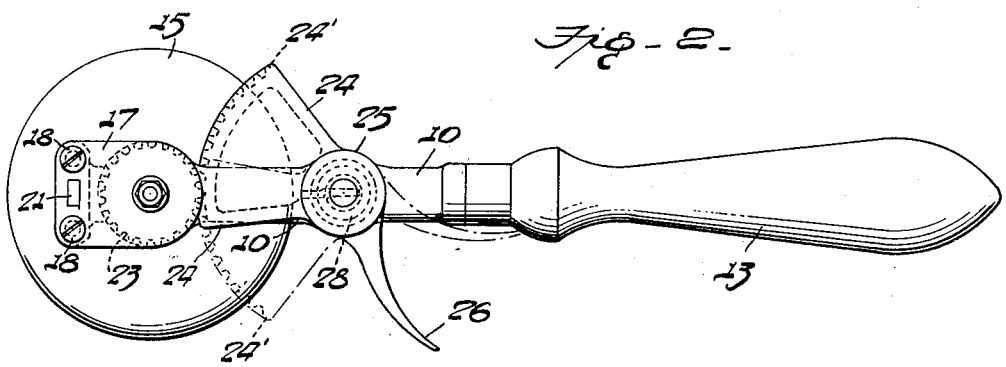
Fig. 2 is a top plan view.
Figure 3:
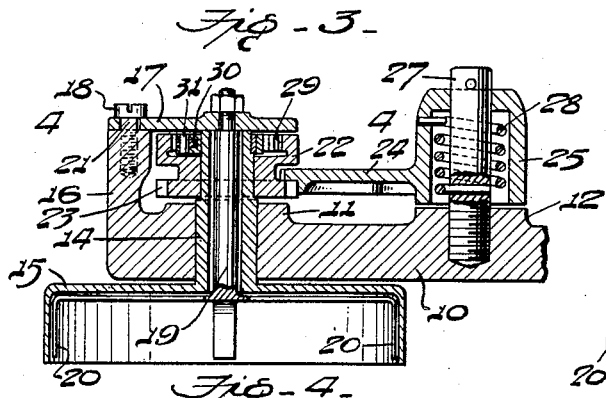
Fig. 3 is a longitudinal section showing the operating parts on an enlarged scale.
Figure 4:
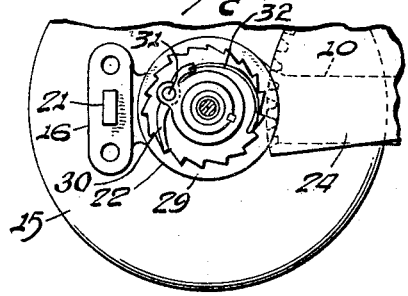
Fig. 4 is a detail view on the same scale showing the driving mechanism connecting the gear segment and rotary cup.
Figure 5:
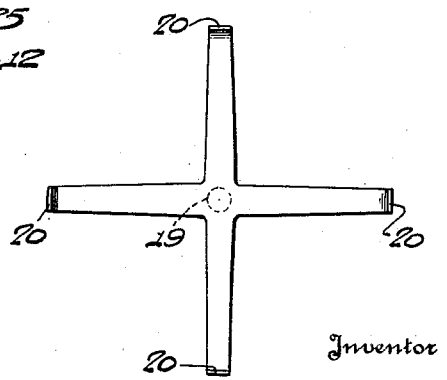
Fig. 5 is a bottom plan view of the stationary cutter.

Rotatably mounted upon the upper reduced end of sleeve 14 is a combined gear and ratchet wheel 22 having gear teeth 23 at its lower end meshing with similar teeth on a gear segment 24. The end teeth 24' of the segment are enlarged to serve as stops to limit the rotary movement of the segment. A hub 25 carries the segment on one side and a handle 26 projects from its other side. The hub is hollow as shown in Fig. 3, and its upper closed end is journalled on a post 27 secured to the shank 10. A spring 28 surrounding the post within the hub returns the segment to the normal position shown in full lines in Fig. 2 after it has been operated. The rotary element 22 has a circular recess in its upper end, and this recess is provided with a series of ratchet teeth 29. A pawl 30 is pivoted to a pin 31 mounted in ears projecting from sleeve 14. The pawl is held in engagement with the ratchet teeth by means of a spring 32.

The operation of my improved dipper is as follows:

The operator grips the handle 13 and scoops a quantity of ice cream into the cup 15 by a scraping action, in the usual manner. Since the cup is only partially filled by this operation, the operator, while the open end of the cup rests at an inclination to the surface of the mass of ice cream in the can, gives the cup a half turn by pressing the lever 26. The lever, engaging the gear teeth 23, rotates the member 22, and this member, acting through ratchet teeth 29 and pawl 30, rotates the sleeve 14 and cup 15 through an angle of approximately 180°. This operation, while loosening the cream within the cup, does not cause it to drop back into the mass from which it was taken, because the cup is still resting with its open end disposed at an inclination to the surface of the mass in the freezer or other receptacle.

When the handle, by reason of the enlarged tooth 24', reaches the limit of its movement, or before, if desired, the handle is released and returns to its normal position, where it is stopped by the other enlarged tooth. The operator now fills the cup by using its opposite edge as a scraper or scoop, after which he lifts it out of the receptacle and deposits the contents of the cup into a suitable box or dish by giving the cup another half revolution. This half revolution of the cup again separates the disk of cream from the cup, and the cup being now held in horizontal position above the container into which its contents are to be received, such contents readily drop into the receptacle.

The cup 15 and cutter 20 may be quickly and easily removed from the shank 10 for cleaning or repair by removing the nut from the rod 19 of the latter and removing the screw 18 to release the plate 17 from the post 16, whereupon the cutter may be withdrawn from the cup, the ratchet wheel 22 may be removed from the sleeve 14 of the cup 15, and the sleeve 14 of the said cup may be withdrawn from the aperture in the enlargement 11 of the shank 10.

Although I have described the operating mechanism as designed for rotating the cup one-half of a revolution at each operation, I do not wish to be confined to this exact degree of rotation. If desired, the parts might be so designed that a complete revolution would be obtained in three or more operations of the handle. Equivalent forms embodying the same principles of operation are intended to be covered by the claims. Also, the enlarged teeth 24' at the ends of the rack might be cut away, leaving smooth surfaces, or the segment might be shortened enough to eliminate the large teeth. Any one of the described forms, or a combination of two of them, would constitute means for limiting the rotation of the cup.

What I claim is:

1. An ice cream dipper, comprising a handle having an opening adjacent one of its ends, a member carried by said handle and overhanging and spaced from the part of said handle in which said opening is formed, a cup having a sleeve journalled in said opening and extending across the space between said handle and overhanging member, a collar rotatable on said sleeve in said space, clutch means between said collar and sleeve for imparting rotation to said sleeve when said collar is rotated in one direction, means carried by said handle for partially rotating said collar in either direction, said last-named means being manually operable to partially rotate said collar in a direction to impart rotation to said sleeve, means urging said last-named means in the opposite direction, a cutter bearing against the interior of said cup, and a stem extending through said sleeve, said stem having one of its ends secured to said cutter and its other end secured to the overhanging member of said handle.

2. An ice cream dipper according to claim 1 wherein the overhanging member is detachably secured to the handle and the stem is detachably secured to said overhanging member.

3. An ice cream dipper according to claim 1 wherein the clutch means between the collar and the sleeve comprises internal ratchet teeth in a flange carried by the collar and a pawl carried by the sleeve.

4. An ice cream dipper according to claim 1 wherein the means carried by the handle for partially rotating the collar comprises a lever and a toothed segment carried by said lever meshing with teeth formed on the periphery of the collar.

In testimony whereof I have hereunto set my hand.

ERNEST S. MILLO.